(12) United States Patent
Coiro et al.

(10) Patent No.: US 11,129,358 B2
(45) Date of Patent: *Sep. 28, 2021

(54) METHOD AND SYSTEM FOR MONITORING AIR FLOW IMPURITY WITHIN AN ANIMAL CAGE

(71) Applicant: ALLENTOWN INC., Allentown, NJ (US)

(72) Inventors: John Coiro, Allentown, NJ (US); Brian Bilecki, Allentown, NJ (US)

(73) Assignee: ALLENTOWN, LLC, Allentown, NJ (US)

( * ) Notice: Subject to any disclaimer, the term of this patent is extended or adjusted under 35 U.S.C. 154(b) by 214 days.

This patent is subject to a terminal disclaimer.

(21) Appl. No.: 15/655,191

(22) Filed: Jul. 20, 2017

(65) Prior Publication Data

US 2018/0168123 A1    Jun. 21, 2018

Related U.S. Application Data

(60) Provisional application No. 62/436,599, filed on Dec. 20, 2016.

(51) Int. Cl.
*A01K 1/03*    (2006.01)

(52) U.S. Cl.
CPC .................................. *A01K 1/031* (2013.01)

(58) Field of Classification Search
CPC ..... B01D 46/0005; B01D 46/10; F24F 13/28; A01K 1/031; A01K 1/0356
USPC ................. 55/490, 499, 502, 385.1; 119/419
See application file for complete search history.

(56) References Cited

U.S. PATENT DOCUMENTS

| 3,167,416 | A | | 1/1965 | Humbert et al. | |
|---|---|---|---|---|---|
| 3,195,505 | A | | 7/1965 | Hauth et al. | |
| 3,334,614 | A | | 8/1967 | Gass et al. | |
| 4,814,033 | A | | 3/1989 | Spearman et al. | |
| 4,862,831 | A | * | 9/1989 | Graham | A01K 1/035 119/419 |
| 5,049,272 | A | | 9/1991 | Nieweg | |
| 5,307,757 | A | | 5/1994 | Coiro et al. | |
| 5,477,810 | A | * | 12/1995 | Wilkison, III | A01K 1/031 119/459 |
| 6,036,737 | A | * | 3/2000 | Smith | B01D 46/42 454/56 |
| 6,159,258 | A | | 12/2000 | Ager et al. | |

(Continued)

FOREIGN PATENT DOCUMENTS

| CA | 2880064 A1 * | 1/2014 | ............... A01K 1/03 |
|---|---|---|---|
| EP | WO 2013/001552 A1 * | 1/2013 | ............... A01K 1/03 |
| WO | 2007061387 A1 | 5/2007 | |

OTHER PUBLICATIONS

International Search Report and Written Opinion, PCT/US2017/48817, dated Nov. 6, 2017.

*Primary Examiner* — Minh Chau T Pham
(74) *Attorney, Agent, or Firm* — Porzio Bromberg & Newman P.C.

(57) ABSTRACT

A method and system for monitoring conditions of an animal cage. An animal caging system including a plurality of animal cages removably connected to an exhaust. Cage collection media is removably mounted in a cage media housing coupled to an exhaust port of the animal cage. Exhaust air dust clings to the collection media as exhaust from the animal cages flows along the length of the collection media.

41 Claims, 12 Drawing Sheets

(56) References Cited

U.S. PATENT DOCUMENTS

| | | | | |
|---|---|---|---|---|
| 6,257,171 | B1* | 7/2001 | Rivard | A01K 1/031 119/419 |
| 6,308,660 | B1 | 10/2001 | Coiro et al. | |
| 6,336,427 | B1* | 1/2002 | Gabriel | A01K 1/031 119/417 |
| 10,575,495 | B2* | 3/2020 | Coiro | G01N 1/2247 |
| 2003/0051676 | A1 | 3/2003 | Rivard | |
| 2006/0278171 | A1* | 12/2006 | Conger | A01K 1/0356 119/419 |
| 2007/0193527 | A1 | 8/2007 | Verhage et al. | |
| 2010/0000190 | A1* | 1/2010 | Kidman | B01D 46/0005 55/502 |
| 2011/0308213 | A1* | 12/2011 | Gillispie | B01D 46/10 55/499 |
| 2014/0373493 | A1* | 12/2014 | Cannon | F24F 13/28 55/490.1 |
| 2015/0004679 | A1 | 1/2015 | Conger et al. | |
| 2016/0174519 | A1* | 6/2016 | Chang | A01K 1/031 119/419 |
| 2016/0353704 | A1* | 12/2016 | Coiro | A01K 1/031 |
| 2018/0103609 | A1* | 4/2018 | Coiro | A01K 1/031 |

* cited by examiner

METHOD AND SYSTEM FOR MONITORING AIR FLOW IMPURITY WITHIN AN ANIMAL CAGE

BACKGROUND OF THE INVENTION

Field of the Invention

The present invention relates to a system for monitoring conditions of an animal cage and in particular to monitoring rodent and other laboratory animal pathogens within the animal cage which is contained within a rack of animal cages for the purposes of monitoring animal health.

Description of Related Art

Systems for providing air and removing exhaust from racks containing animal cages are known. U.S. Pat. No. 5,307,757 describes a ventilated animal rack and animal cage system including a forced air system in which positive air is supplied by an air inlet manifold. Air is removed from the cage by negative air pressure to an exhaust manifold. The exhausted air is treated with a laboratory air treatment system or portable HEPA filtered exhaust unit and is released to the atmosphere.

U.S. Pat. No. 6,308,660 describes an animal caging system including a self-sealing animal cage removably connected to an air supply and an exhaust. The self-sealing animal cage is supported by a rack. The self-sealing animal cage is sealed by an air inlet connection and an air outlet connection to the air supply and the exhaust connection. After the cages are removed from the air supply and the exhaust, the air inlet connection and the exhaust connection seals the cage to prevent air from entering or exiting the cage.

The air supply and exhaust are provided with an air delivery and exhaust apparatus side mounted to the rack. The air delivery and exhaust apparatus is integrated with high efficiency particulate air (HEPA) filters. The air delivery and exhaust apparatus operates in a positive pressure mode for pushing air into the cage or in a negative mode for withdrawing air from the cage. Air from the environment is HEPA filtered and is used as supply air in the air delivery apparatus and exhaust air from the exhaust apparatus is HEPA filtered before being emitted into the environment. The animal caging system provides isolation of the self-sealing animal cage and provides containment of airborne pathogens within the caging system.

Animals contained in the animal cages can have exposure to viruses, parasites and bacteria. Sentinel animals that have been placed in a cage environment have been removed from the environment and monitored to find out if rodent pathogen or other harmful organisms are present in that environment.

It is desirable to provide a method and system for monitoring conditions of an animal cage, not requiring the use of sentinel animals.

SUMMARY OF THE INVENTION

The present invention relates to a method and system for monitoring conditions of an animal cage in a rack of animal cages. The animal cage can be removably an exhaust of the rack. Cage collection media can be removably retained in a cage collection media housing within the animal cage. The cage collection media housing can be coupled to an exhaust port of the animal cage. The cage collection media housing positions the cage collection media in line with the flow of exhaust air from the cage to an exhaust port. Exhaust air dust clings to the cage collection media. The cage collection media can be used for pre-filtration of the exhaust exiting the cage to remove dust and dander. In one embodiment, the animal cage can be removably connected to an air supply.

The cage collection media can extend perpendicularly to the direction of the flow of the exhaust air. Exhaust air passes along the length of the cage collection media. The cage collection media can be formed of for example one or more of polyester, polyethylene or polypropylene materials. In one embodiment, a spunbond polypropylene material is used in a cage collection media assembly. In one embodiment, the exhaust port and coupled cage collection media housing can be positioned in a lid of the cage.

A coupler retainer of the cage collection media housing can be slidably received within a coupling body attached to the cage for coupling the cage collection media housing to the lid of the cage. In one embodiment, a ledge extends from a bottom of an inner surface of the cage collection media housing. Cage collection media received within the cage collection media housing can be supported by the ledge. An indentation can be formed walls of the cage collection media to allow the cage collection media retained within the cage collection media housing to be easily grasped during removal of cage collection media from cage collection media housing.

In an alternative embodiment, the cage collection media housing can include a wall extending from a base. The case can have a circular shape. A cover can be removably attached to the cage collection media housing. The cover can have the same shape as the base. Cage collection media received in the cage collection media housing can be formed of a plurality of projections extending from a cage collection media base.

In one embodiment, the cage collection media can be removed from the animal cage and placed into a sample container. The sample container can be forwarded to a facility for testing of the cage collection media. For example, the cage collection media can be tested for rodent pathogens.

The invention will be more fully described by reference to the following drawings.

DETAILED DESCRIPTION

Reference will now be made in greater detail to a preferred embodiment of the invention, an example of which is illustrated in the accompanying drawings. Wherever possible, the same reference numerals will be used throughout the drawings and the description to refer to the same or like parts.

Figures 1A, 1C:
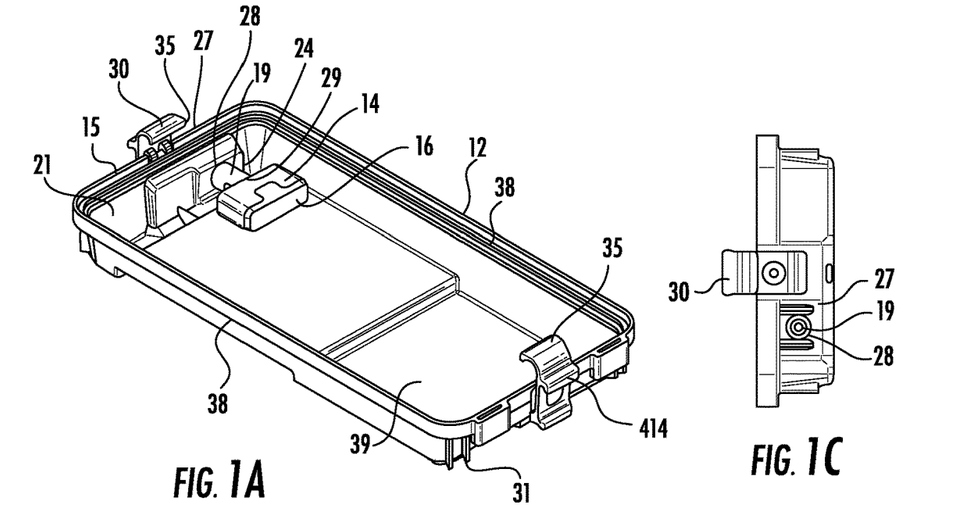
FIG. 1A is a perspective bottom view of an interior of a cage lid including a removable cage collection media housing.
FIG. 1C is a left end view of the a cage lid including the removable cage collection media housing shown in FIG. 1A.
Figure 1B:
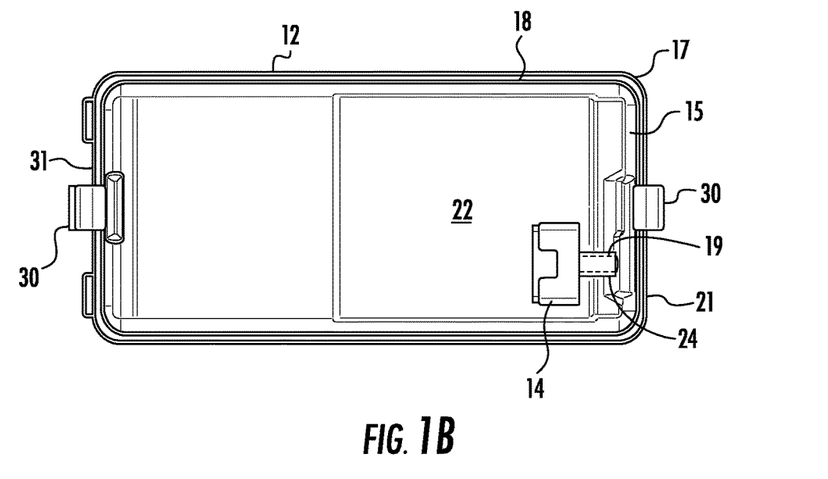
FIG. 1B is a bottom plan view of the interior of a cage lid including the removable cage collection media housing shown in FIG. 1A.
Figure 6:
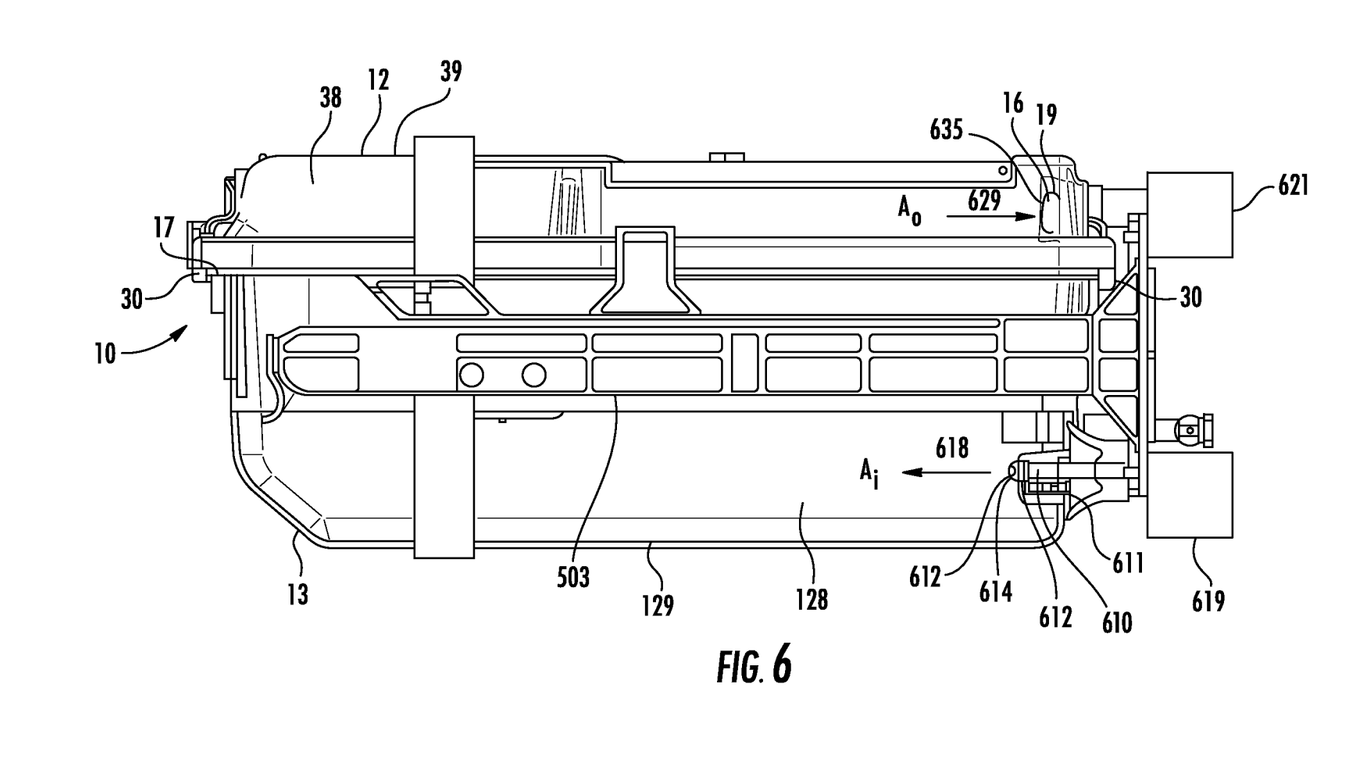
FIG. 6 is a schematic diagram of an animal cage including a connection to an inlet air and exhaust.

FIGS. 1A-1D show an embodiment of a cage lid including removable cage collection media housing 14 used for monitoring animal health within an animal cage via exhaust air dust carried by air flow within the cage in accordance with the teachings of the present invention. Referring to FIG. 6, animal cage assembly 10 can include animal cage lid 12 and animal cage bottom 13. For example, animal cage lid 12 and animal cage bottom 13 can be formed of polycarbonate. Cage collection media housing 14 is removably coupled to end 15 of cage lid 12, as shown in FIG. 1A. Cage collection media 16 is removably positioned within cage collection media housing 14. Referring to FIG. 1B, animal cage lid 12 can include gasket 17 within lip 18. Gasket 17 can be used to provide a seal between animal cage lid 12 an animal cage bottom 13 as shown in FIG. 6.

Referring to FIGS. 1B and 1C, coupling body 19 extends from inner surface 21 of animal cage lid 12 into interior 22. Coupler retainer 24 of cage collection media housing 14 is slidably received within end 29 of coupling body 19 for coupling cage collection media housing 14 to animal cage lid 12 as shown in FIG. 1B. End 28 of coupling body 19 can extend from outer surface 27 of animal cage lid 12 to the exterior as shown in FIG. 1C. Coupler retainer 24 can be disengaged from coupling body 19 for disengaging cage collection media housing 14 from animal cage lid 12.

Figure 1D:
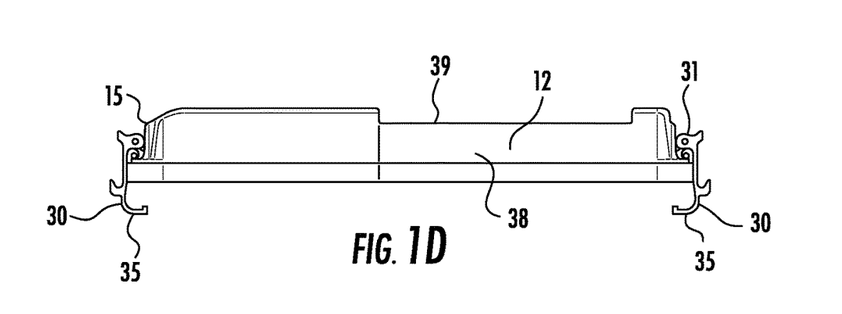
FIG. 1D is a side view of the a cage lid including the removable cage collection media housing shown in FIG. 1A.

Locking clip 30 can be attached to end 15 and end 31 of animal cage lid 12 as shown in FIG. 1D. Locking clip 30 includes hook section 35. Locking clips 30 can attach animal cage lid 12 to animal cage bottom 13 as shown in FIG. 6. Animal cage lid 12 includes one or more walls 38 extending from ceiling 39. Animal cage bottom 13 includes one or more walls 128 extending from floor 129.

Figure 2A:
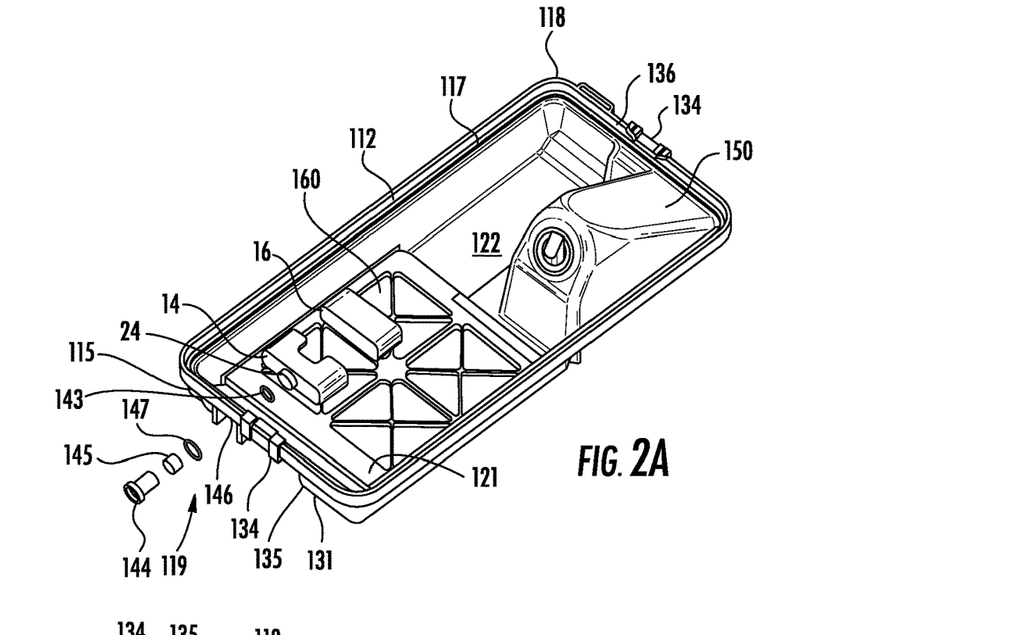
FIG. 2A is a perspective bottom view of an interior of an alternate cage lid including a removable cage collection media housing.
Figure 2B:
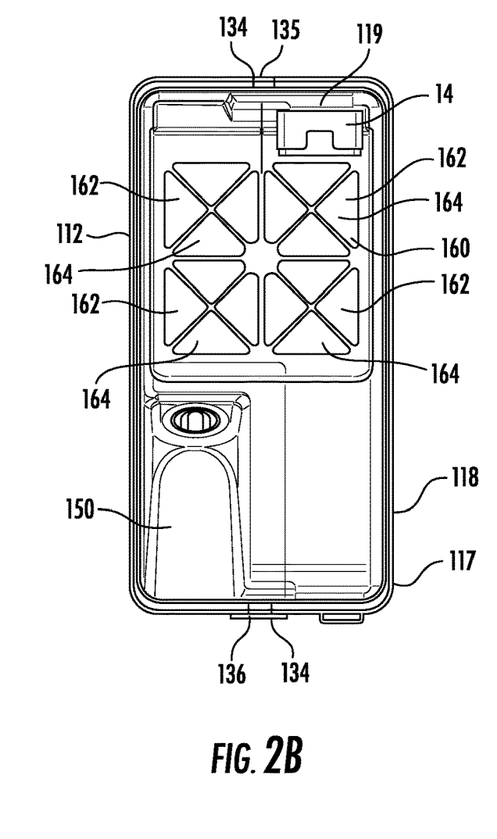
FIG. 2B is a bottom plan view of the interior of a cage lid including the removable cage collection media housing shown in FIG. 2A.
Figure 2C:
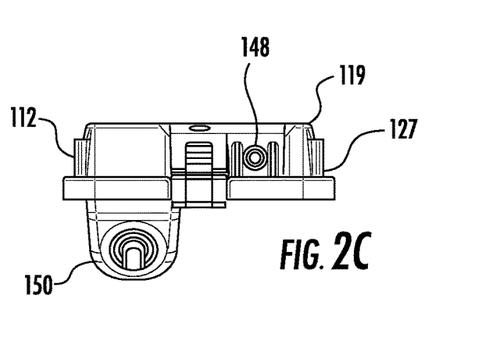
FIG. 2C is a left end view of the a cage lid including the removable cage collection media housing shown in FIG. 2A.
Figure 7:
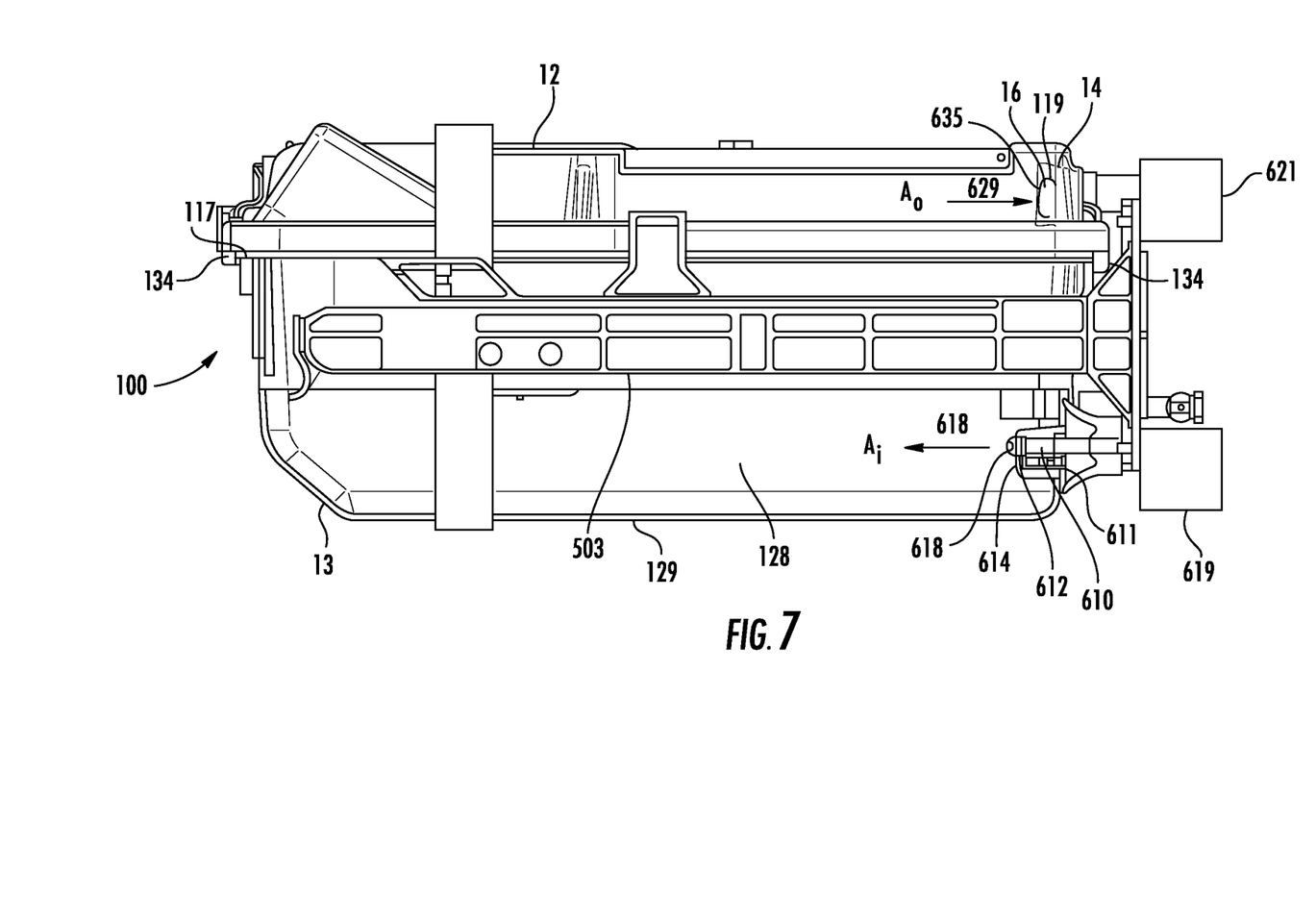
FIG. 7 is a schematic diagram of an animal cage including a connection to an inlet air and exhaust.

FIGS. 2A-2C show an alternate embodiment of a cage lid including removable cage collection media housing 14. Animal cage lid 112 includes water delivery apparatus 150 and ventilation section 160. Water delivery apparatus 150 can be an external bottle top (EBT) to allow user access to the bottle of water from the outside of the cage as shown in FIG. 2A. It allows the user to easily monitor the bottle for ample water and allows for removal and replacement of the bottle without the need to open animal cage lid 112 to remove a bottle mounted internally. Ventilation section 160 includes one or more openings 162 as shown in FIG. 2B. Each of openings 162 can be covered with filter material 164. Animal cage lid 112 and animal cage bottom 13 form animal cage assembly 100 as shown in FIG. 7. For example, animal cage lid 112 can be formed of polycarbonate.

Referring to FIG. 2A, cage collection media housing 14 is removably coupled to end 115 of cage lid 112, as shown in FIG. 2A. Animal cage lid 112 can include gasket 117 within lip 118. Gasket 117 can be used to provide a seal between animal cage lid 112 and animal cage bottom 13, as shown in FIG. 7.

Referring to FIG. 2A, coupling body 119 extends from inner surface 121 of animal cage lid 112 into interior 122 and from outer surface 131 of animal cage lid 112 to the exterior. Coupling body 119 is formed of interior port 143 and exterior port 144. Coupler 145 can be received in aperture 146 of animal cage lid 112. Coupler 145 can be retained with retainer ring 147 for coupling coupler 145 to animal cage lid 112.

Coupler retainer 24 of cage collection media housing 14 is slidably received within coupling body 119 for coupling cage collection media housing 14 to animal cage lid 112 as shown in FIG. 2B. Coupler retainer 24 can be removed from coupling body 119 for disengaging cage collection media housing 14 from animal cage lid 112.

Valve 148 can be positioned within coupling body 119 for controlling flow of exhaust from coupling body 119 as shown in FIG. 2C. Flexible locking clip 134 can be attached to end 135 and end 136 of animal cage lid 112. Flexible locking clips 134 can attach animal cage lid 112 to animal cage bottom 13, as shown in FIG. 7.

Figure 3A:
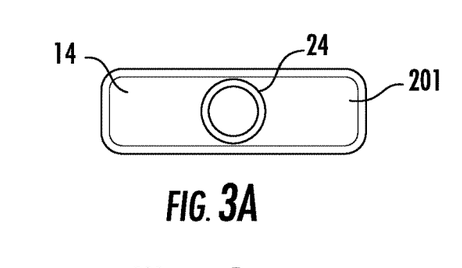
FIG. 3A is an end view of a cage collection media housing.
Figure 3B:
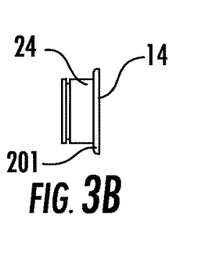
FIG. 3B is a side view of a coupler retainer of the cage collection media housing shown in FIG. 3A.
Figure 3C:
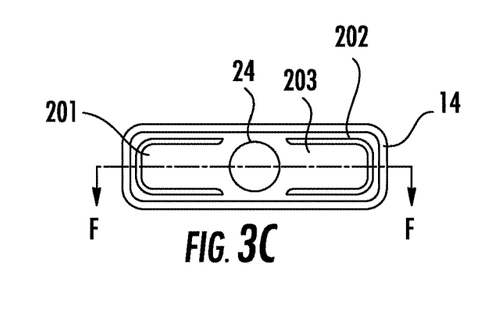
FIG. 3C is a plan view of the opposite end of the cage collection media housing shown in FIG. 3A.
Figure 3D:
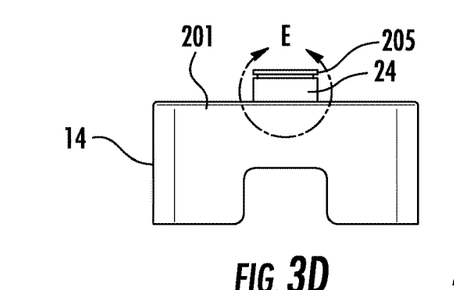
FIG. 3D is schematic diagram of a top view of the cage collection media housing shown in FIG. 3C.
Figure 3E:
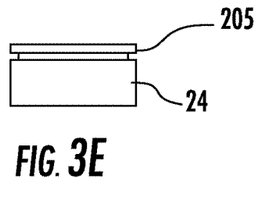
FIG. 3E is a schematic view of the coupler retainer of the cage collection media housing shown in FIG. 3B.
Figures 3F, 3H:
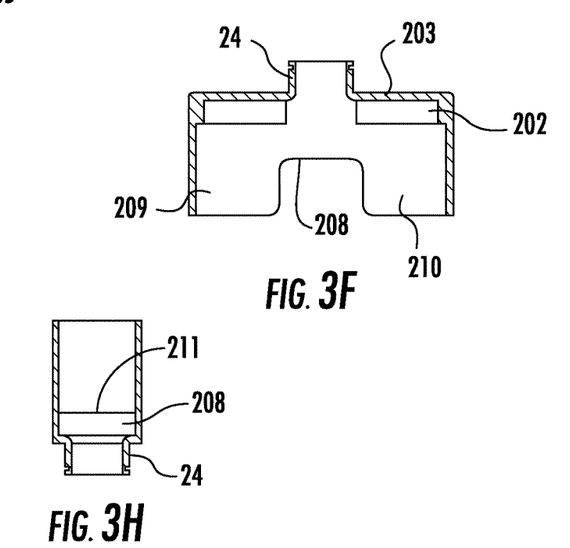
FIG. 3F is a detailed cross sectional view of a connector of the cage collection media housing shown in FIG. 3C.
FIG. 3H is a detailed cross sectional view of a portion of the cage collection media housing shown in FIG. 3G.
Figure 3G:
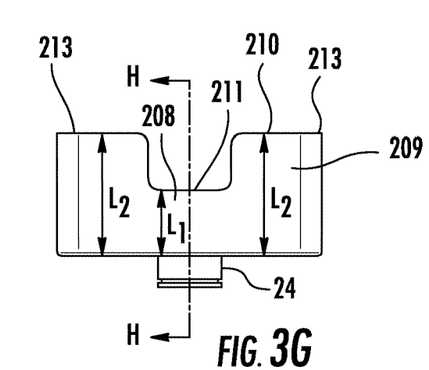
FIG. 3G is a top plan view of the cage collection media housing shown in FIG. 3A.
Figure 4A:
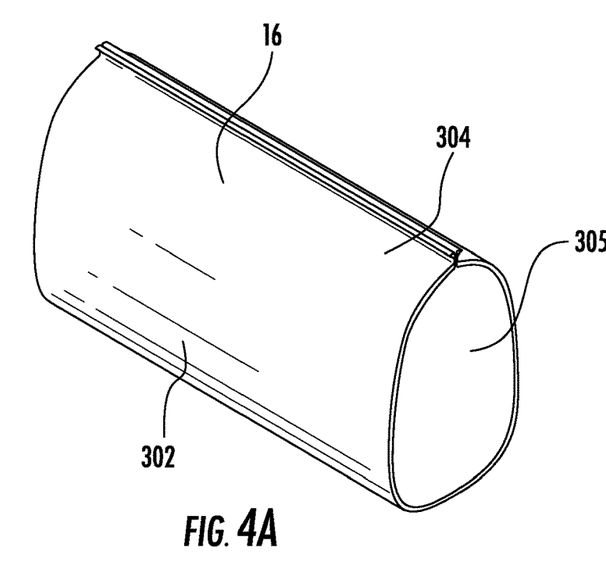
FIG. 4A is a perspective view of cage collection media of the present invention.
Figure 4B:
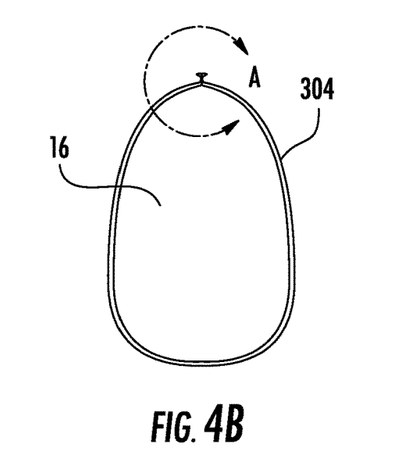
FIG. 4B is an end view of the cage collection media shown in FIG. 4A.
Figure 4C:
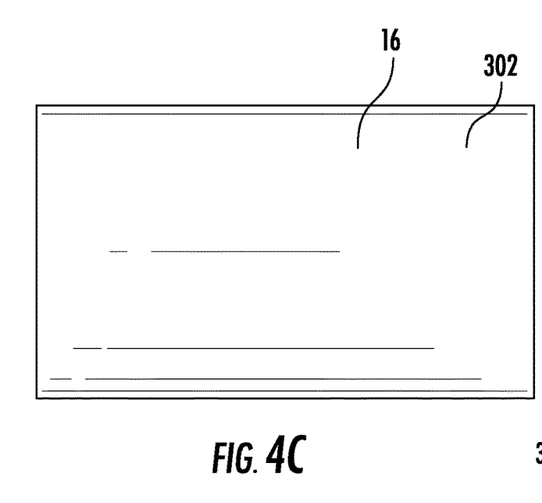
FIG. 4C is a side view of the cage collection media shown in FIG. 4A.
Figure 4D:
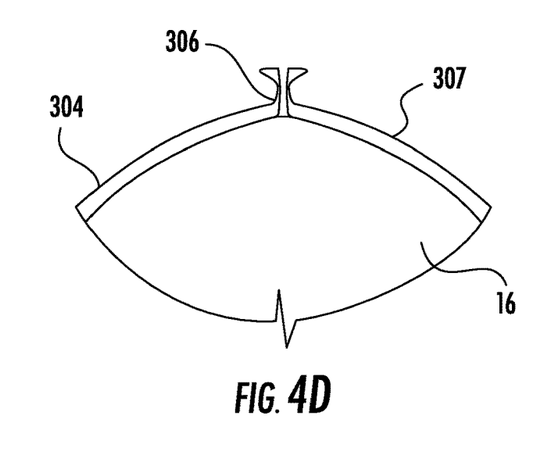
FIG. 4D is a section view of a top portion of the cage collection media shown in FIG. 4A.

FIGS. 3A-3H illustrate cage collection media housing 14. Coupler retainer 24 extends from end 201 of cage collection media housing 14 as shown in FIGS. 3A-3B. Ledge 202 extends from bottom 203 of inner surface 204 of collection media housing 14 as shown in FIG. 3C. Cage collection media 16 received within cage collection media housing 14 can be supported by ledge 202. Coupler retainer 24 includes lip 205 as shown in FIGS. 3D and 3E. Indentation 208 is formed in one or more walls 209 at end 210 of coupler retainer 24 as shown in FIG. 3F and FIG. 3G. Indentation 208 reduces length $L_1$ of central portion 211 compared to length $L_2$ of end portions 213. In one embodiment, indention 208 has a squared U shape. Indentation 208 allows cage collection media 16 retained within cage collection media housing 14 to be easily grasped during removal of cage collection media 16 from cage collection media housing 14.

Cage collection media 16 can have an oblong shape with rounded ends as shown in FIGS. 4A-4D. Cage collection media 16 can be formed of body portion 302. In one embodiment body portion 302 is formed of wall 304 wrapped around core 305. Side 306 of wall 304 can be attached to side 307 of wall 304. For example, side 306 can be attached to side 307 by sewing with polyester thread. In one embodiment wall 304 and core 305 can be formed of polyester, polyethylene or polypropylene. In one embodiment wall 304 can be formed of spunbond polypropylene, such as manufactured as Uniloft.

Figure 5A:
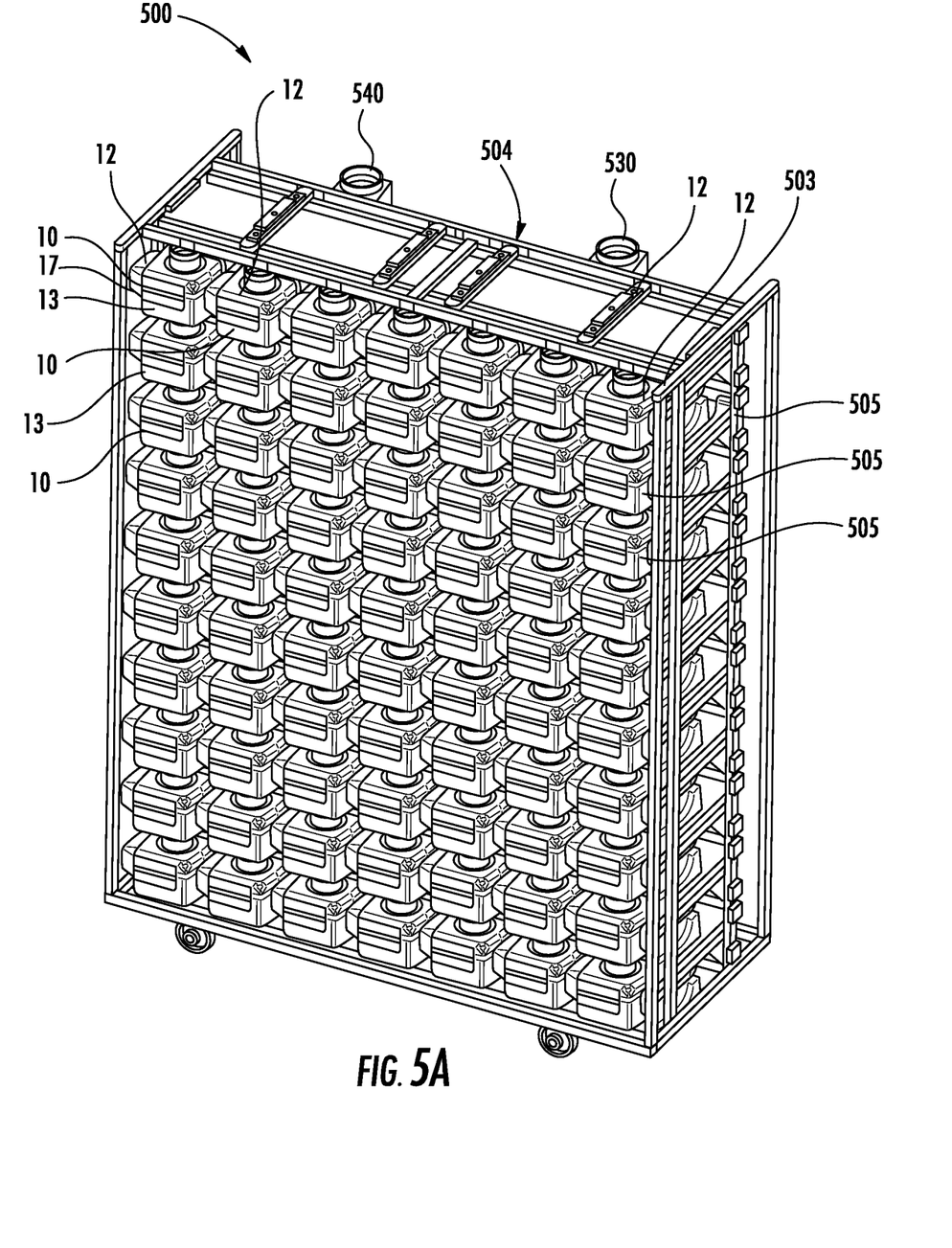
FIG. 5A is a schematic diagram of a plurality of the cage assemblies including the cage collection media housing of the present invention used in a ventilated rack and or a static rack.
Figure 5B:
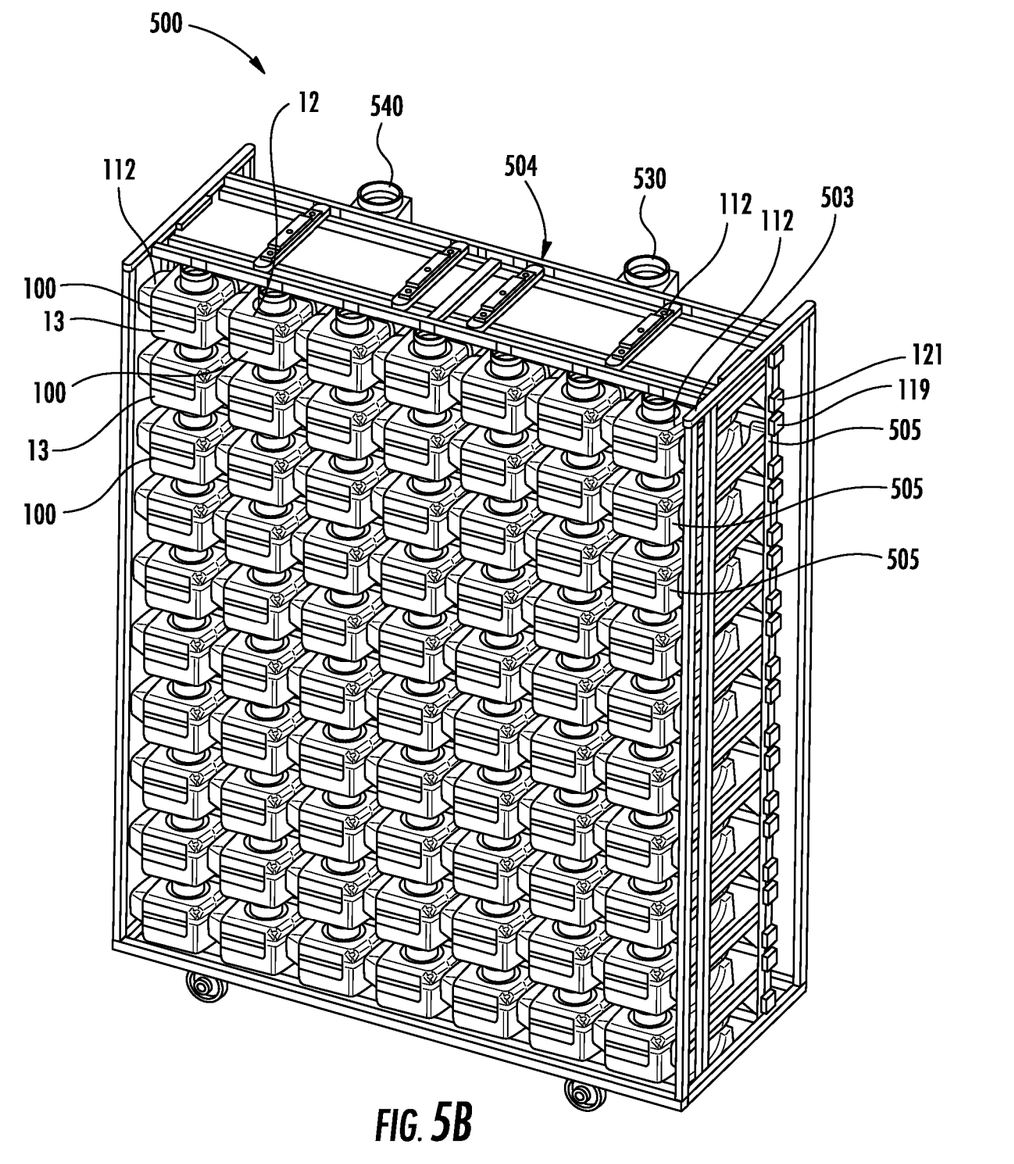
FIG. 5B is a schematic diagram of a plurality of the cage assemblies including the cage collection media housing of the present invention used in a ventilated rack and or a static rack.

FIGS. 5A-5B show an embodiment of ventilated/static rack 500. Individual animal cage assemblies 10 are supported on at least one shelf, platform or suspended runner system 503 on rows 505 of rack 504 in FIG. 5A. Individual animal cage assemblies 100 are supported on at least one shelf, platform or suspended runner system 503 on rows 505 of rack 504 in FIG. 5B. Example animal cage racks are manufactured by Allentown, Inc. as Nexgen, XJ mouse caging system, Sealed Positive Pressure (SPP) caging, Bio-Containment Unit (BCU), Micro-Vent and PNC.

At least one rack mounted supply blower or equivalent can be coupled rack air input port 530 for supplying air to rack 500. At least one rack mounted exhaust blower or equivalent can be coupled to rack exhaust port 540 for removing exhaust from rack 500. Alternatively air delivery and exhaust apparatus can supply and exhaust air via wall mounted or tower blower ventilation system, such as one manufactured by Allentown Inc. as an EcoFlo Rack, EcoFlo Tower, or EcoFlo Halo. Alternatively air delivery and exhaust apparatus can be supplied by an above ceiling or remotely mounted air supply device such as one manufactured by Allentown Inc. Eco Flo Interstitial Blower while using the facility available exhaust system to exhaust the rack such as demonstrated in the Allentown Inc system FIAS (Facility Integrated Airflow Solutions). Alternatively, the rack can include an exhaust system to exhaust the rack without using any supply air system.

FIG. 6 illustrates air delivery and exhaust which can be used with ventilated rack 500 used with animal cage assembly 10. Nozzle 610 can be received or positioned adjacent air inlet port 611. Nozzle 610 includes at least one air opening 612 formed in end 614 of nozzle 610 for emitting air 618 into animal cage assembly 10 in the direction of arrow $A_i$. Nozzle 610 includes at least one air opening 612 formed in end 614 of nozzle 610 for emitting air 618 into animal cage assembly 100 in the direction of arrow $A_i$ as shown in FIGS. 6 and 7. Referring to FIG. 6, air supply plenum 619 provides air 618 to nozzle 620. Air 618 circulates within the animal cage assembly 10 and exits animal cage assembly 10 in the direction of arrow $A_o$ as exhaust 629 through cage collection media 16 retained in collection media housing 14 to exhaust plenum 621. Referring to FIG. 7, air supply plenum 619 provides air 618 to nozzle 620. Air 618 circulates within the animal cage assembly 100 and exits animal cage assembly 100 in the direction of arrow $A_o$ as exhaust 629 through cage collection media 16 retained in collection media housing 14 to exhaust plenum 621.

During use, cage collection media 16 can be received in cage collection media housing 14. Coupler retainer 24 of collection media housing 14 is received within coupling body 19 to attach cage collection media 16 to animal cage assembly 10 or animal cage assembly 100. Particulate 635 in exhaust 629 is entrapped in cage collection media 16. Cage collection media 16 can be removed from cage collection media housing 14. Removed cage collection media 16 can be placed into sample container. Sample container can be placed in mailing package to be forwarded to a facility for testing of cage collection media 16. For example, cage collection media 16 can be tested for rodent pathogens.

Figure 8A:
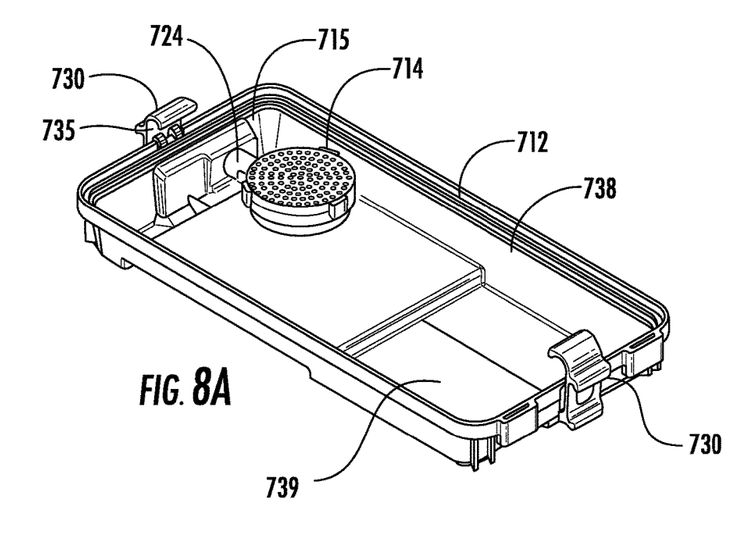
FIG. 8A is a perspective bottom view of an interior of a cage lid including a removable cage collection media housing.
Figure 10:
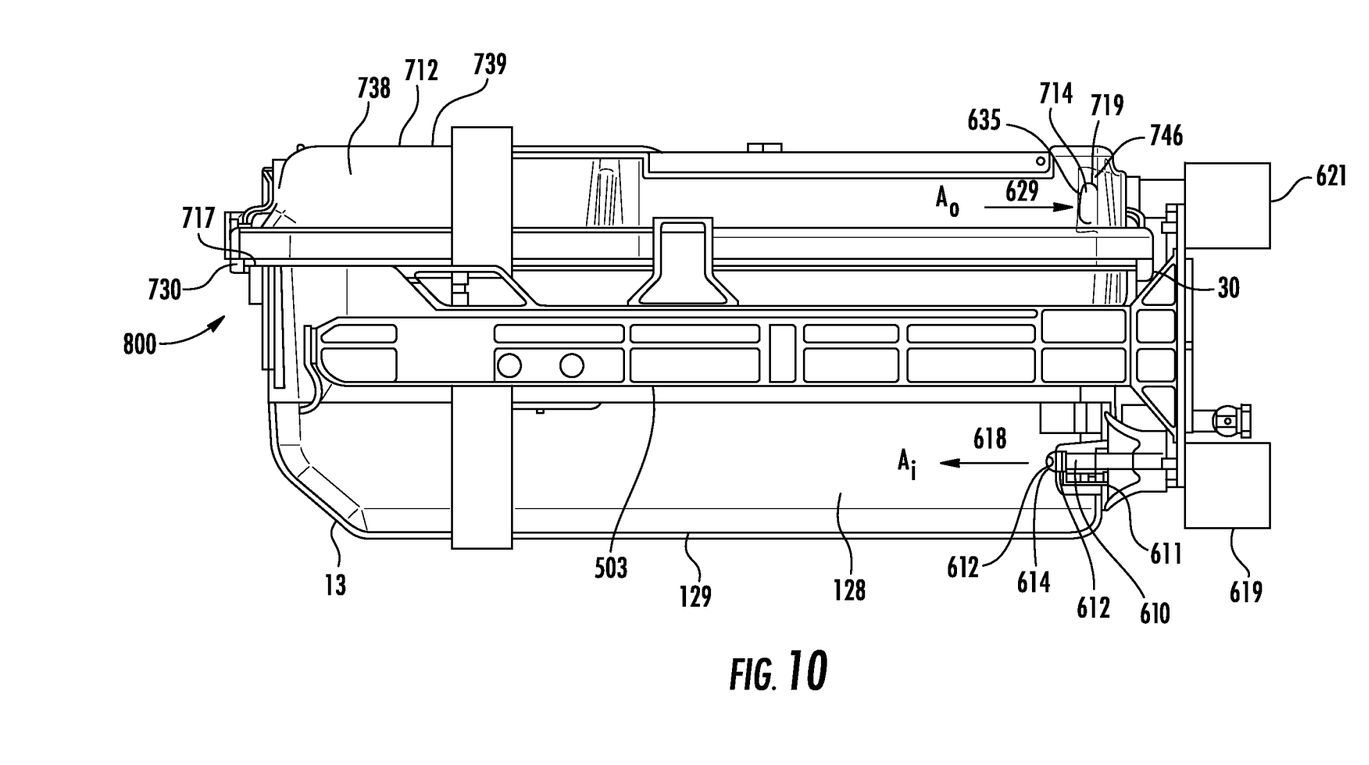
FIG. 10 is a schematic diagram of an animal cage including a connection to an inlet air and exhaust.

FIGS. 8A-8D show an embodiment of cage lid 712 including removable cage collection media housing 714. Referring to FIG. 10, animal cage assembly 800 can include animal cage lid 712 and animal cage bottom 13. For example, animal cage lid 712 and animal cage bottom 13 can be formed of polycarbonate. Cage collection media housing 714 is removably coupled to end 715 of cage lid 712, as shown in FIG. 8A.

Figure 8B:
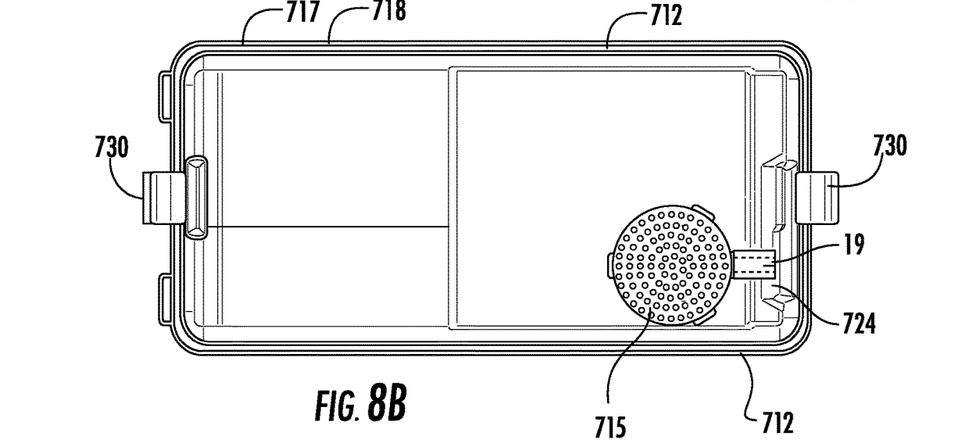
FIG. 8B is a bottom plan view of the interior of a cage lid including the removable cage collection media housing shown in FIG. 8A.
Figure 8C:
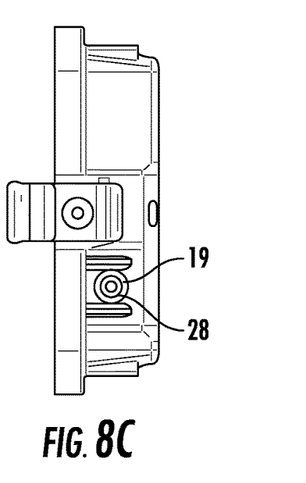
FIG. 8C is a left end view of the a cage lid including the removable cage collection media housing shown in FIG. 8A.

Referring to FIG. 8B, animal cage lid 712 can include gasket 717 within lip 718. Gasket 117 can be used to provide a seal between animal cage lid 712 an animal cage bottom 13 as shown in FIG. 10. Coupler retainer 724 of cage collection media housing 714 is slidably received within coupling body 19 for coupling cage collection media housing 714 to animal cage lid 712. Coupler retainer 724 can be removed from coupling body 19 for disengaging cage collection media housing 714 from animal cage lid 712.

Figure 8D:
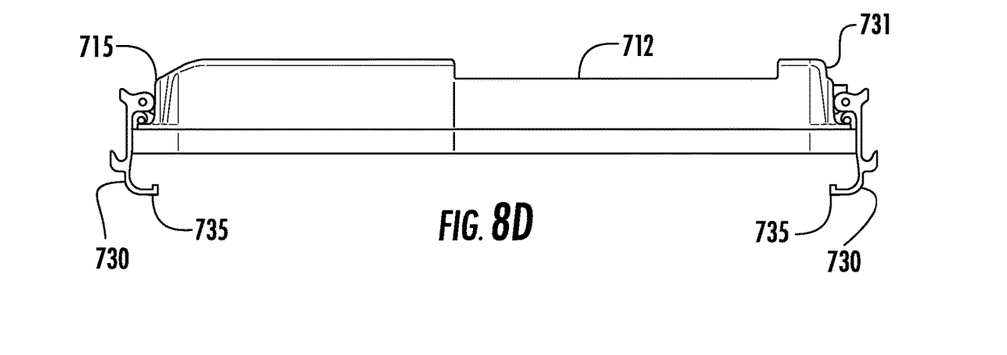
FIG. 8D is a side view of the a cage lid including the removable cage collection media housing shown in FIG. 8A.

Locking clip 730 can be attached to end 715 and end 731 of animal cage lid 712 as shown in FIG. 8D. Locking clip 730 includes hook section 735. Locking clips 730 can attach animal cage lid 712 to animal cage bottom 13 as shown in FIG. 10. Animal cage lid 712 includes one or more walls 738 extending from ceiling 739.

Figure 9A:
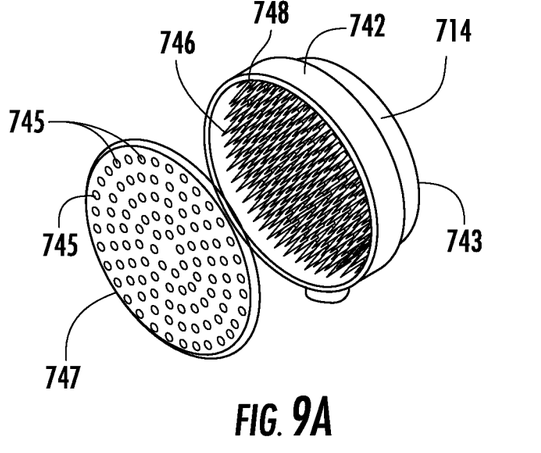
FIG. 9A is a schematic diagram of a cage collection media housing.

Cage collection media 746 is removably positioned within cage collection media housing 714 as shown in FIG. 9A. Cage collection media housing 714 can include wall 742 extending from base 743.

Figure 9B:
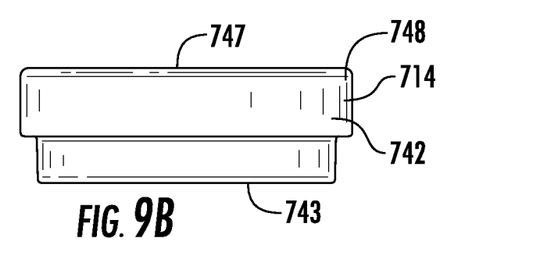
FIG. 9B is a side view of the cage collection media housing shown in FIG. 9A.
Figure 9C:
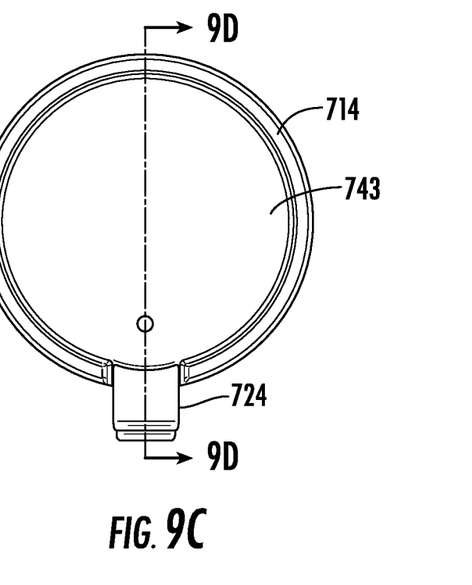
FIG. 9C is a plan view of the opposite end of the cage collection media housing shown in FIG. 9A.
Figure 9D:
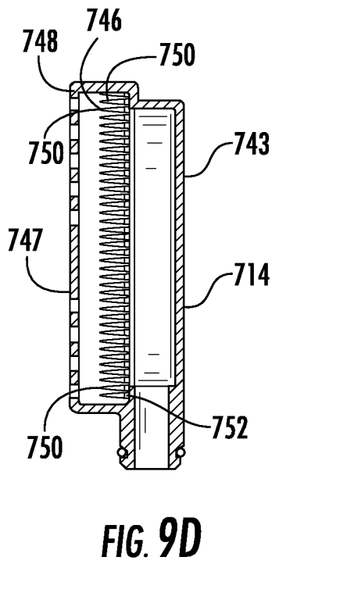
FIG. 9D is a detailed cross sectional view of a portion of the cage collection media housing shown in FIG. 9A and FIG. 9C.

Base 743 can have a circular shape. Alternatively, base 743 can have an oval or polygon shape. Cover 747 can be removably attached to cage collection media housing 714 at top 748 of wall 742 as shown in FIGS. 9B-9D. Cover 747 can include a plurality of apertures 745. Cover 747 can have a circular shape. Alternatively, cover 747 can have an oval or polygon shape. Cover 747 can have the same shape as base 743. In one embodiment, cover 747 is sonic welded to base 743. Cage collection media 746 can be formed of a plurality of projections 750 extending from cage collection media base 752 as shown in FIG. 9D. In one embodiment projections 750 and cage collection media base 752 can be formed of polyester, polyethylene or polypropylene. Referring to FIG. 10, air supply plenum 619 provides air 618 to nozzle 610. Air 618 circulates within the animal cage assembly 800 and exits animal cage assembly 800 in the direction of arrow $A_o$ as exhaust 629 through cage collection media 746 retained in collection media housing 714 to exhaust plenum 621. Cage collection media 746 can be used as an HEPA filter for filtering exhaust 629. In one embodiment, cage collection media 746 can capture exhaust air dust used for monitoring animal health within an animal cage via exhaust air dust carried by exhaust 629.

Figure 11:
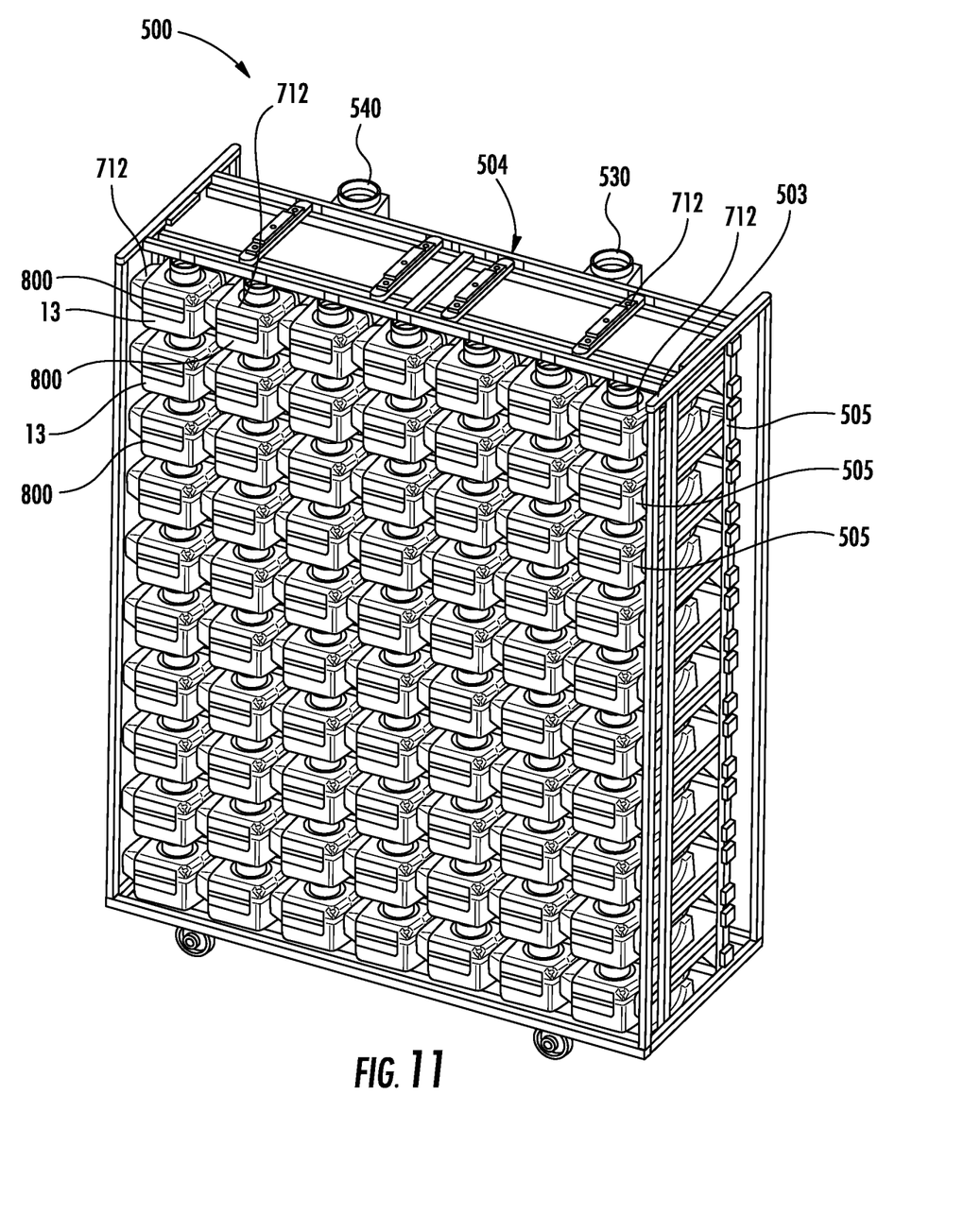
FIG. 11 is a schematic diagram of a plurality of the cage assemblies including the cage collection media housing of the present invention used in a ventilated rack and or a static rack

FIG. 11 show an embodiment of ventilated/static rack 500. Individual animal cage assemblies 800 are supported on at least one shelf, platform or suspended runner system 503 on rows 505 of rack 504.

It is to be understood that the above-described embodiments are illustrative of only a few of the many possible specific embodiments, which can represent applications of the principles of the invention. Numerous and varied other arrangements can be readily devised in accordance with these principles by those skilled in the art without departing from the spirit and scope of the invention.

What is claimed is:

1. An animal cage system comprising:
   at least one animal cage assembly;
   a cage lid and a cage bottom,
   an air supply supplying air to the at least one animal cage and an exhaust plenum receiving exhaust from the at least one cage through an exhaust port in the cage lid, the air from the air supply passes through said at least one cage to exit the cage as the exhaust through the exhaust port;
   a rack for supporting the at least one animal cage;
   and a collection media housing within the at least one animal cage, the cage collection media housing being removably coupled to the exhaust port; wherein
   cage collection media is configured to be removably received within the collection media housing and the cage collection media captures one or more particulates within the exhaust.

2. The animal cage system of claim 1 further comprising:
   a gasket, the gasket being received in a lip of the cage lid, the gasket providing a seal between the cage lid and the cage bottom.

3. The animal cage system of claim 1 further comprising:
   a locking clip attached to either end of the cage lid, the locking clip including a hook section, the hook section engaging the cage bottom for attaching the cage lid to the cage bottom.

4. The animal cage system of claim 1 wherein the cage lid includes a coupling body and the cage collection media housing includes a coupler retainer, the coupling retainer adapted to be slidably received within the coupling body for coupling the collection media housing to the cage lid.

5. The animal cage system of claim 4 wherein the collection media housing comprises one or more walls extending from a housing bottom, the coupler retainer extending from an exterior surface of the housing bottom.

6. The animal cage system of claim 4 wherein the one or more walls include an indentation to reduce a central portion of the one or more walls from an end portion of the one or more walls.

7. The animal cage system of claim 4 further comprising:
   a ledge extending from the housing bottom.

8. The animal cage system of claim 1 wherein the cage collection media is formed of a body portion having a wall wrapped around a core.

9. The animal cage system of claim 8 wherein the wall and the core are formed of polyester, polyethylene or polypropylene.

10. The animal cage system of claim 8 wherein the wall and the core are formed of spun-bound polypropylene.

11. The animal cage system of claim 1 further comprising a water delivery apparatus coupled or integral with an interior of the cage lid.

12. The animal cage system of claim 1 wherein the cage lid includes a ventilation section, the ventilation section including one or more openings, each of the one or more opening being covered by a filter material.

13. The animal cage system of claim 1 wherein the cage collection media housing include a wall extending from base and a removable cover being attached at a top of the wall.

14. The animal cage system of claim 13 wherein the base and the cover have a circular shape.

15. The animal cage system of claim 13 wherein the cover includes a plurality of apertures.

16. The animal cage system of claim 13 wherein the cage collection media is formed of a plurality of projections extending from a cage collection media base.

17. The animal cage system of claim 16 wherein the projections and the cage collection media base are formed of polyester, polyethylene or polypropylene.

18. An animal cage lid comprising:
   a cage lid, said cage lid including one or more walls extending from a ceiling,
   an exhaust port for receiving exhaust from within the cage lid, and
   a collection media housing, removably coupled to the exhaust port;
      wherein cage collection media is adapted to be removably received within the collection media housing and the cage collection media captures one or more particulates within the exhaust.

19. The animal cage lid of claim 18 wherein the cage lid includes a coupling body extending within the lid from the exhaust port, the collection media housing comprises one or more walls extending from a housing bottom, a coupler retainer extending from an exterior surface of the housing bottom, the coupling retainer adapted to be slidably received within the coupling body for coupling the collection media housing to the cage lid.

20. The animal cage lid of claim 19 wherein the one or more walls extending from the housing bottom of the collection media housing include an indentation to reduce a central portion of the one or more walls from an end portion of the one or more walls.

21. The animal cage lid of claim 19 further comprising:
   a ledge extending from the housing bottom.

22. The animal cage lid of claim 18 wherein the cage collection media housing include a wall extending from base and a removable cover being attached at a top of the wall.

23. The animal cage lid of claim 22 wherein the base and the cover have a circular shape.

24. The animal cage lid of claim 22 wherein the cover includes a plurality of apertures.

25. The animal cage lid of claim 22 wherein the cage collection media is formed of a plurality of projections extending from a cage collection media base.

26. The animal cage lid of claim 25 wherein the projections and the cage collection media base are formed of polyester, polyethylene or polypropylene.

27. An animal cage assembly comprising:
   a cage base, said cage base including one or more walls extending from a floor, a cage lid, said cage lid including one or more walls extending from a ceiling;
 an exhaust port for receiving exhaust from within the cage lid; and
a collection media housing, removably coupled to the exhaust port;
 wherein cage collection media is adapted to be removably received within the collection media housing and the cage collection media captures one or more particulates within the exhaust.

28. The animal cage assembly of claim 27 wherein the cage lid includes a coupling body extending within the lid from the exhaust port, the collection media housing comprises one or more walls extending from a housing bottom, a coupler retainer extending from an exterior surface of the housing bottom, the coupling retainer can be slidably received within the coupling body for coupling the collection media housing to the cage lid.

29. The animal cage assembly of claim 27 wherein the one or more walls extending from the housing bottom of the collection media housing include an indentation to reduce a central portion of the one or more walls from an end portion of the one or more walls.

30. The animal cage assembly of claim 27 further comprising:
 a ledge extending from the housing bottom.

31. The animal cage assembly of claim 27 wherein further comprising a gasket, the gasket being received in a lip of the cage lid, the gasket providing a seal between the cage lid and the cage bottom.

32. The animal cage assembly of claim 27 further comprising:
 a locking clip attached to either end of the cage lid, the locking clip including a hook section, the hook section engaging the cage bottom for attaching the cage lid to the cage bottom.

33. The animal cage system of claim 27 wherein the cage collection media housing include a wall extending from base and a removable cover being attached at a top of the wall.

34. The animal cage system of claim 33 wherein the base and the cover have a circular shape.

35. The animal cage system of claim 33 wherein the cover includes a plurality of apertures.

36. The animal cage system of claim 33 wherein the cage collection media is formed of a plurality of projections extending from a cage collection media base.

37. The animal cage system of claim 36 wherein the projections and the cage collection media base are formed of polyester, polyethylene or polypropylene.

38. The animal cage system of claim 27 wherein the cage collection media comprises a body, the body being formed of polyester, polyethylene or polypropylene.

39. The animal cage system of claim 38 wherein the body is formed of a wall wrapped around a core.

40. The cage animal cage system of claim 39 wherein the wall and the core are formed of spun-bound polypropylene.

41. A cage collection media for use in an animal cage assembly, the cage collection media being formed of a plurality of projections extending from a cage collection media base, the projections and the cage collection media base are formed of polyester, polyethylene or polypropylene.

* * * * *